United States Patent [19]
Izawa et al.

[11] Patent Number: 5,153,578
[45] Date of Patent: Oct. 6, 1992

[54] APPARATUS AND METHOD FOR ESTABLISHING IDENTICAL DATA IN DUAL ATM SWITCHES

[75] Inventors: Naoyuki Izawa, Mitaka; Yoshihiro Uchida, Kawasaki; Masami Murayama, Yokohama; Yasuhiro Aso, Tokyo, all of Japan

[73] Assignee: Fujitsu Limited, Kawasaki, Japan

[21] Appl. No.: 542,043

[22] Filed: Jun. 22, 1990

[30] Foreign Application Priority Data

Jun. 22, 1989 [JP] Japan .................................. 1-160439

[51] Int. Cl.⁵ .............................................. H04L 7/00
[52] U.S. Cl. .................... 340/825.21; 340/827; 379/279; 371/8.2; 370/16; 370/60.1; 370/94.2
[58] Field of Search ........................ 370/60, 60.1, 94.2, 370/94.1, 4, 16; 379/279; 371/8.2; 340/825.21, 827, 825.2

[56] References Cited

U.S. PATENT DOCUMENTS

| | | | |
|---|---|---|---|
| 4,477,895 | 10/1984 | Casper et al. | 371/8 |
| 4,646,287 | 2/1987 | Larson et al. | 370/60 |
| 4,730,304 | 3/1988 | Mezera et al. | 379/279 |
| 4,752,927 | 6/1988 | Melling, Jr. | 371/8 |
| 4,774,703 | 9/1988 | Force et al. | 370/60 |
| 4,947,388 | 8/1990 | Kuwahara et al. | 370/60 |
| 4,956,839 | 9/1990 | Torii et al. | 370/94.1 |
| 5,014,261 | 5/1991 | Shinbashi et al. | 370/16 |

Primary Examiner—Donald J. Yusko
Assistant Examiner—Brian Zimmerman
Attorney, Agent, or Firm—Staas & Halsey

[57] ABSTRACT

An ATM switching system includes two ATM switches which are the same as each other. Each of the ATM switches includes a switch buffer, and a cell counter which indicates the number of cells in the switch buffer. Each of the ATM switches also includes a difference calculator, which calculates the difference between the number of cells in the two switch buffers when one of the ATM switches is changed from an out-of-service state to a slave mode. At this time, the other ATM switch operates in a master mode. Each of the ATM switches further includes a dummy cell generator, which generates a number of dummy cells which corresponds to the difference calculated by the difference calculator. The generated dummy cells are written into the switch buffer in the slave mode. When it is determined that when all of the dummy cells have been output from the switch buffer, the two ATM switches are syunchronized with each other.

20 Claims, 13 Drawing Sheets

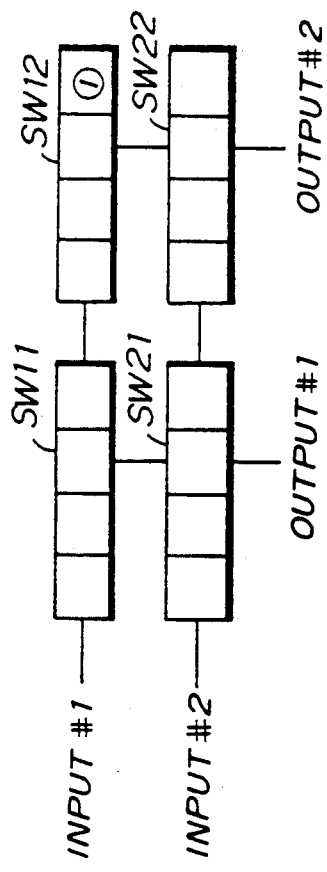
FIG.1C PRIOR ART
FIG.1E PRIOR ART
FIG.1D PRIOR ART

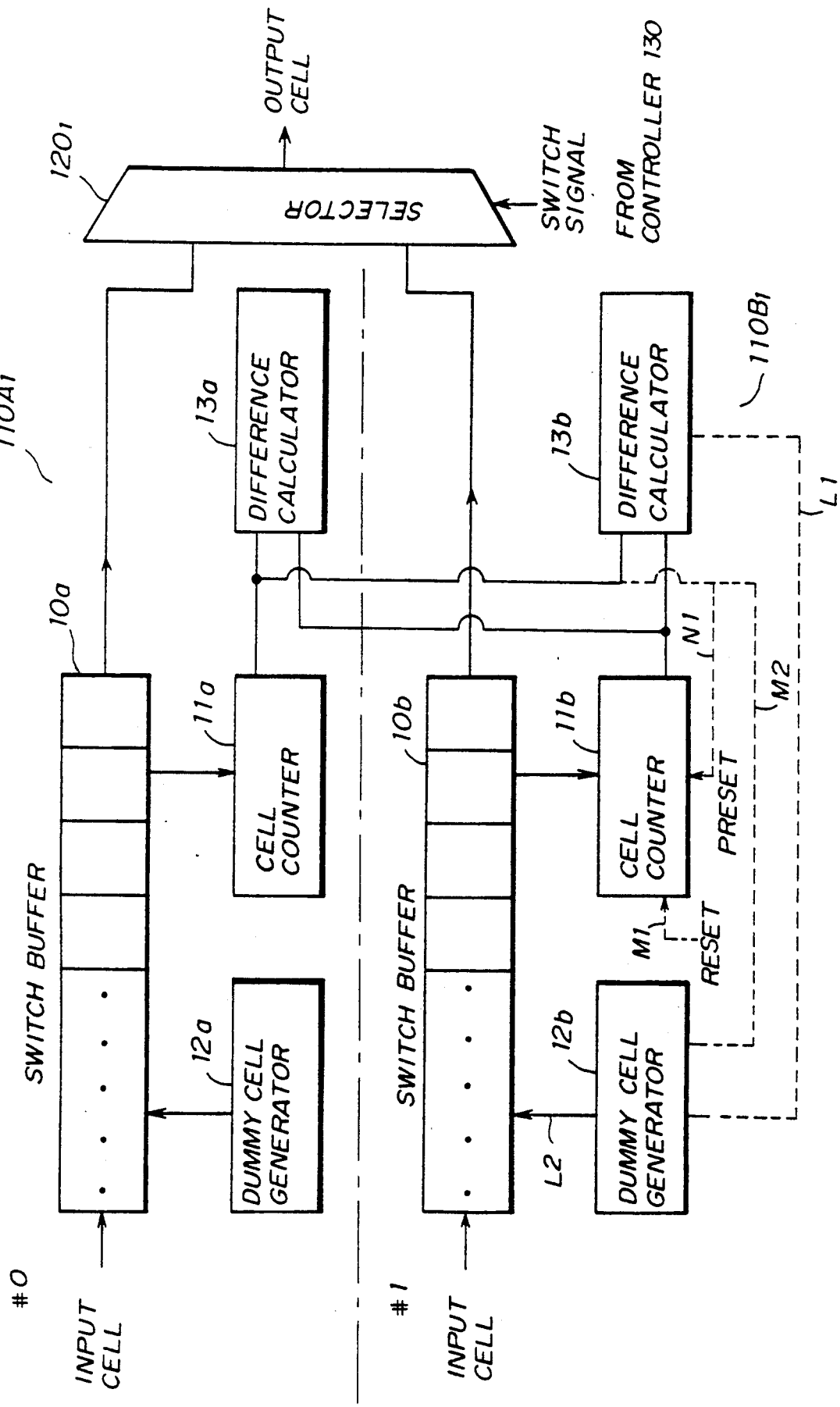

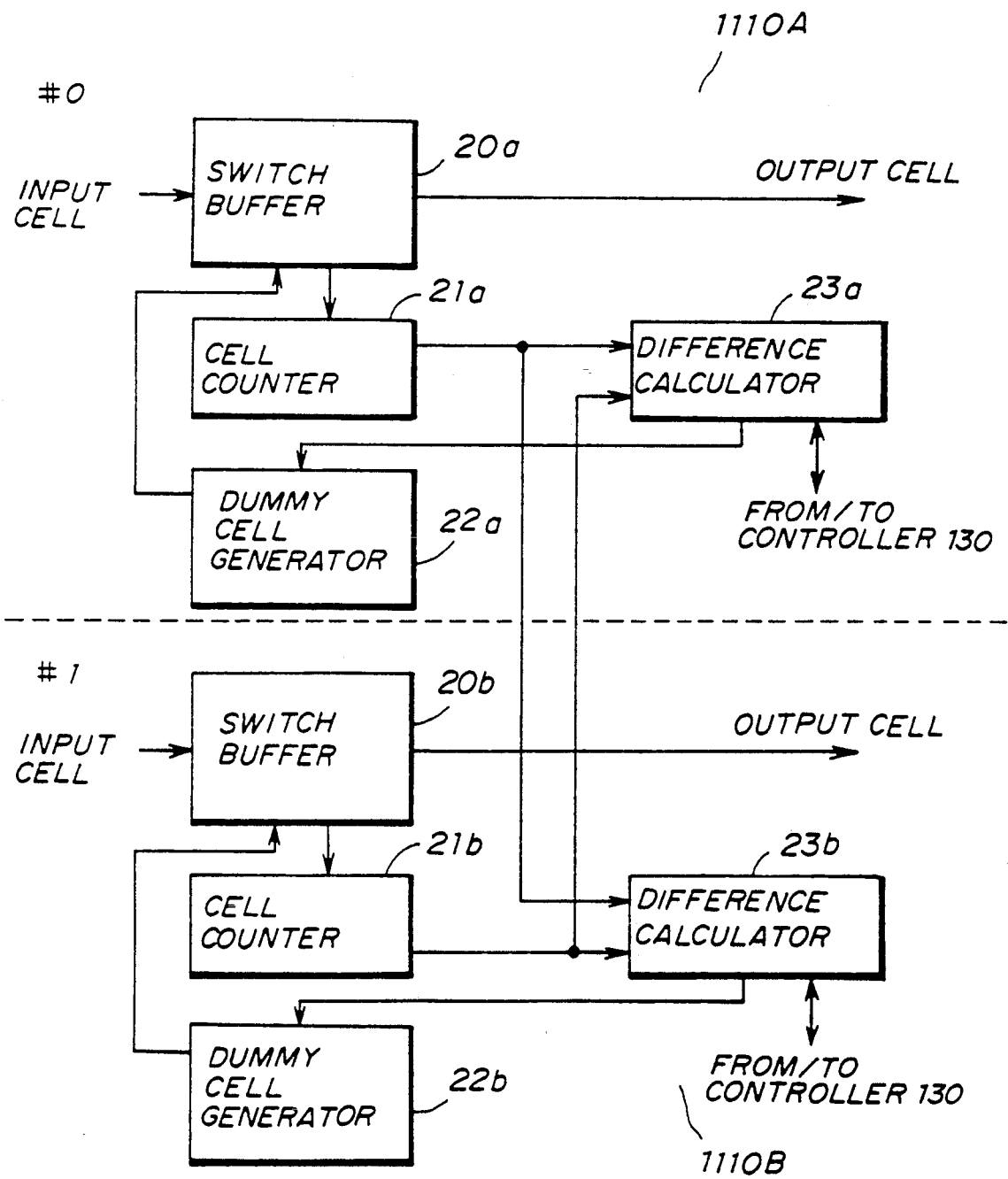

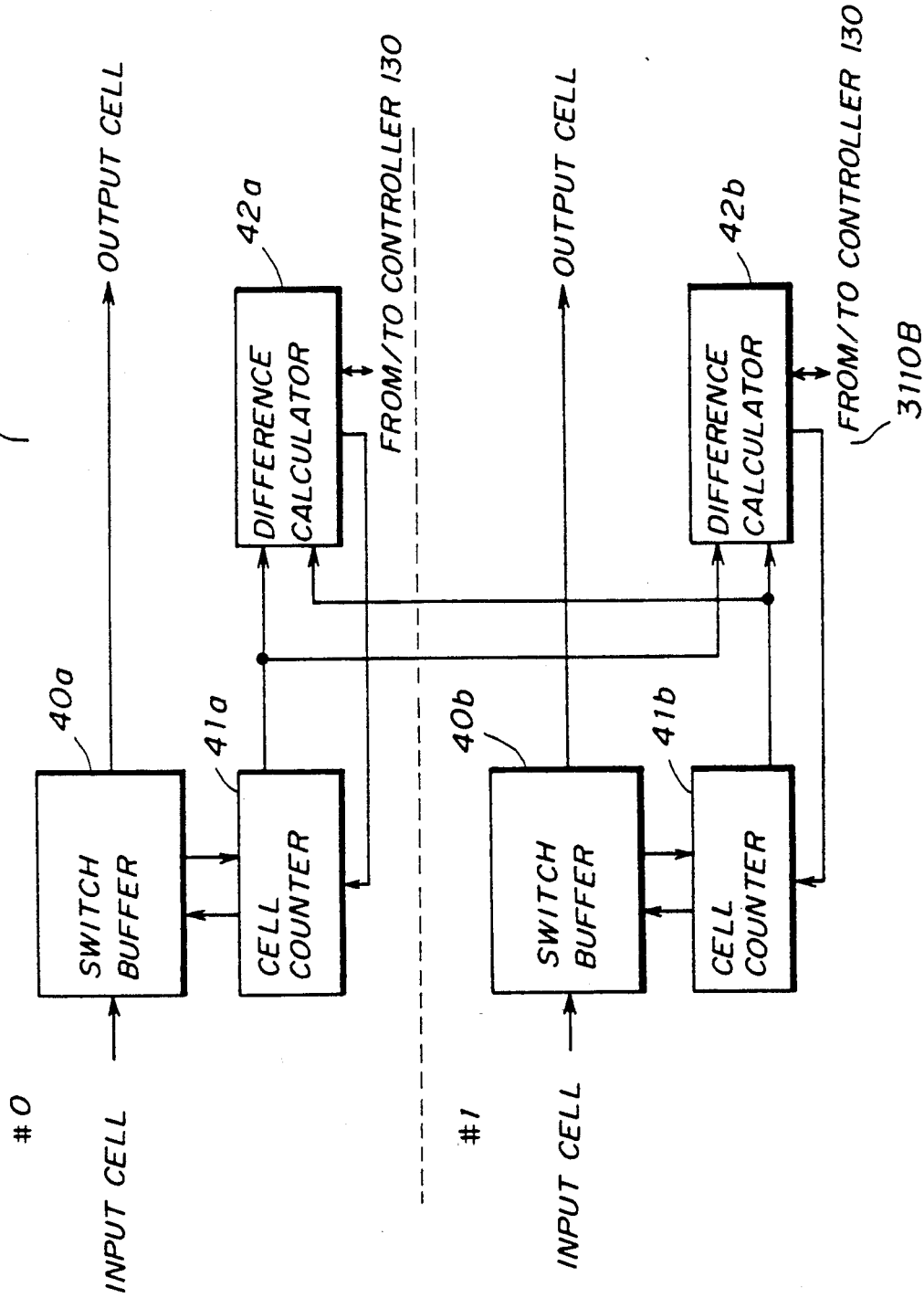

APPARATUS AND METHOD FOR ESTABLISHING IDENTICAL DATA IN DUAL ATM SWITCHES

BACKGROUND OF THE INVENTION

The present invention generally relates ATM (asynchronous transfer mode) switching system having a dual ATM switch structure.

There is a limit on the bit rate of data transmission in a conventional switching system by the use of public lines. From this point of view, there has been considerable activity regarding the development of an ATM switching system which can transfer data at higher bit rates.

In an ATM switching system, data is divided into cells. One cell is the unit of data transmission. A header is included in each cell having data. The ATM switching system selects a data transmission route by means of hardware in accordance with the contents of the header. The ATM switching system can provide a large number of data transmission routes, which are realized by buffers.

Generally, two identical primary structural elements in a switching system are provided in order to realize high reliability. For the same purpose, it is desirable that the number of primary structural elements in even ATM switching systems be doubled. A conventional ATM switching system has a plurality of storing buffers arranged in a matrix, and each of the buffers is capable of storing a plurality of cells. Each buffer can always accept input cells successively and output cells successively. In other words, cells are successively input to each buffer, while each buffer also outputs cells successively. In a case where the ATM switching system has two identical ATM switches and these ATM switches are in service, it is necessary for the two in-service ATM switches to operate in the same way. That is, the two ATM switches must have the same operating state. In this case, one of the two ATM switches which are in service serves as a master ATM switch and the other ATM switch serves as a slave ATM switch.

Since the master ATM switch and the slave ATM switch operate in the same way, it is possible to switch the ATM switches from the master ATM switch (in a master mode) to the slave ATM switch (in a slave mode) when a failure occurs in the master ATM switch. The ATM switch in which a failure takes place is set to the out-of-service state and is investigated. After the failure in the ATM switch is eliminated, it is switched from the out-of-service state to the in-service state. It should be noted that at this time there is no cell in the ATM switch. That is, the contents of the ATM switch which will be set to the in-service state are different from those in the master ATM switch which is operating. Thus, even when the ATM switch is switched from the out-of-service state to the in-service state, it is impossible to set the ATM switch to the master ATM switch. As a result, it is desired to overcome the above-mentioned problem.

SUMMARY OF THE INVENTION

It is a general object of the present invention to provide an improved ATM switching system in which the above-mentioned disadvantage is eliminated.

A more specific object of the present invention is to provide an ATM switching system in which one of the two ATM switches in the out-of-service state can serve as the master switch system immediately after it is switched from the out-of-service state to the in-service state.

The above objects of the present invention are achieved by an ATM (asynchronous transfer mode) switching system comprising:

a first ATM switch having input lines and output lines;

a second ATM switch having input lines and output lines, the first ATM switch having a structure identical to the second ATM switch;

input means, coupled to the first and second ATM switches, for supplying cells via an input transmission line to the input lines of the first and second ATM switches; and select means, coupled to the first and second ATM switches, for selecting either one of the first ATM switch or the second ATM switch so that the output lines of a selected one of the first and second ATM switches are coupled to an output line extending from the ATM switching system and operates in a master mode.

Each of the first and second ATM switches includes:

buffer means, provided at a crosspoint where a corresponding one of the input lines and a corresponding one of the output lines cross, for temporarily storing the cells supplied from the corresponding one of the input lines and for outputting the cells to the corresponding one of the output lines;

counter means, coupled to the buffer means, for counting a number of the cells in the buffer means and for outputting a counter value indicative of the number of the cells;

difference calculating means, coupled to the counter means of the first ATM switch and the counter means of the second ATM switch, for calculating a difference between the counter values in the counter means of the first and second ATM switches when the selected one of the first and second ATM switches is in an in-service state and the other one of the first and second ATM switches is in an out-of-service state, and;

dummy cell generating means, coupled to the difference calculating means and the buffer means, for generating a number of dummy cells corresponding to the difference produced by the difference calculating means and for writing the dummy cells into the buffer means of the other one of the first and second ATM switches which is in the out-of-service state so that the other one of the first and second ATM switches in the out-of-service state is changed to a slave mode from the out-of-service state.

The ATM switching system further comprises control means for determining whether or not the dummy cells in the buffer means of the other one of the first and second ATM switches in the slave mode have been output therefrom, so that when it is determined by the control means that all of the dummy cells have been output from the buffer means, the first and second ATM switches are synchronized with each other.

The aforementioned objects of the present invention are also achieved by using the first and second ATM switches which are configured as follows. That is, each of the first and second ATM switches includes:

buffer means, provided at a crosspoint where a corresponding one of the input lines and a corresponding one of the output lines cross, for temporarily storing the cells supplied from the corresponding one of the input lines and for outputting the cells to the corresponding one of the output lines;

counter means, coupled to the buffer means, for counting a number of the cells in the buffer means and for outputting a counter value indicative of the number of the cells, the counter value in the counter means of the selected one of the first and second ATM switches which is in an in-service state being written into the counter of the other one of the first and second ATM switch which is in an out-of-service state so that the other one of the first and second ATM switch is changed to a slave mode from the out-of-service state; and difference calculating means, coupled to the counter means of the first ATM switch and the counter means of the second ATM switch, for calculating a difference between the counter values in the counter means of the first and second ATM switches when the selected one of the first and second ATM switches is in the in-service state and the other one of the first and second ATM switches is in the out-of-service state.

The ATM switching system further comprises control means for determining whether or not a number of cells which corresponds to the counter value written into the buffer means of the other one of the first and second ATM switches which is in the slave mode has been output from the buffer means, so that when it is determined by the control means that the number of cells has been output from the buffer means in the slave mode, the first and second ATM switches are synchronized with each other.

The aforementioned objects of the present invention are also achieved by an ATM switching system (asynchronous transfer mode) comprising:

a first ATM switch having input lines and output lines;

a second ATM switch having input lines and output lines, the first ATM switch having a structure identical to the second ATM switch, each of the first and second ATM switches including buffer means, provided at a crosspoint where a corresponding one of the input lines and a corresponding one of the output lines cross, for temporarily storing cells supplied from the corresponding one of the input lines and for outputting the cells to the corresponding one of the output lines;

input means, coupled to the first and second ATM switches, for supplying the cells via an input transmission line to the input lines of the first and second ATM switches; and select means, coupled to the first and second ATM switches, for selecting either one of the first ATM switch or the second ATM switch so that the output lines of a selected one of the first and second ATM switches are coupled to an output transmission line extending from the ATM switching system and operates in a master mode.

The ATM switching system also comprises:

dummy cell generating means, coupled to the first and second ATM switches, for generating a predetermined number of dummy cells and for writing the dummy cells into the buffer means of the other one of the first and second ATM switches which is in an out-of-service state; and determining means, coupled to the first and second ATM switches, for determining whether or not all of the dummy cells have been output from the buffer means after the other one of the first and second ATM switches is changed from the out-of-service state to a slave mode, the other one of the first and second ATM switches operating in an in-service state where the selected one of the first and second ATM switches is in a master mode, so that when it is determined by the control means that all of the dummy cells have been output from the buffer means, the first and second ATM switches are synchronized with each other.

The aforementioned objects of the present invention are also achieved by an ATM switching system (asynchronous transfer mode) comprising:

a first ATM switch having input lines and output lines;

a second ATM switch having input lines and output lines, the first ATM switch having a structure identical to the second ATM switch, each of the first and second ATM switches including buffer means, provided at a crosspoint where a corresponding one of the input lines and a corresponding one of the output lines cross, for temporarily storing cells supplied from the corresponding one of the input lines and for outputting the cells to the corresponding one of the output lines;

input means, coupled to the first and second ATM switches, for supplying the cells via an input transmission line to the input lines of the first and second ATM switches; and select means, coupled to the first and second ATM switches, for selecting either one of the first ATM switch or the second ATM switch so that the output lines of a selected one of the first and second ATM switches are coupled to an output transmission line extending from the ATM switching system and operates in a master mode.

The ATM switching system also comprises:

counter means, coupled to the first and second ATM switches, for counting a number of cells in the buffer means of the selected one of the first and second ATM switches which is in an in-service state so that the selected one of the first and second ATM switches operates in a master mode; and control means, coupled to the first and second ATM switches and the counter means, for determining whether or not a number of cells which is equal to the number of cells counted by the counter means has been output from the buffer means of the other one of the first and second ATM switches after the other one of the first and second ATM switches is changed from an out-of-service state to a slave mode, so that when it is determined by the control means that the number of cells has been output from the buffer means in the slave mode, the first and second ATM switches are synchronized with each other.

BRIEF DESCRIPTION OF THE DRAWINGS

Other objects, features and advantages of the present invention will become apparent from the following detained description when read in conjunction with the accompanying drawings, in which:

FIGS. 1A through 1E are diagrams illustrating a conventional ATM switching system having a dual ATM switch structure;

FIG. 3 is a block diagram of a crosspoint switch arranged at a crosspoint in one of the two ATM switches in the ATM switching system shown in FIG. 2 and a crosspoint switch at the corresponding crosspoint in the other ATM switch;

FIG. 4 is a block diagram of a crosspoint switch arranged at a crosspoint in one of the two ATM switches in the ATM switching system shown in FIG. 2 and a crosspoint switch at the corresponding crosspoint in the other ATM switch according to a first preferred embodiment of the present invention;

FIG. 8 is a block diagram of a crosspoint switch arranged at a crosspoint in one of the two ATM switches in the ATM switching system shown in FIG. 2 and a crosspoint switch at the corresponding crosspoint in the other ATM switch according to a third preferred embodiment of the present invention, and;

DESCRIPTION OF THE PREFERRED EMBODIMENTS

Figure 1A:
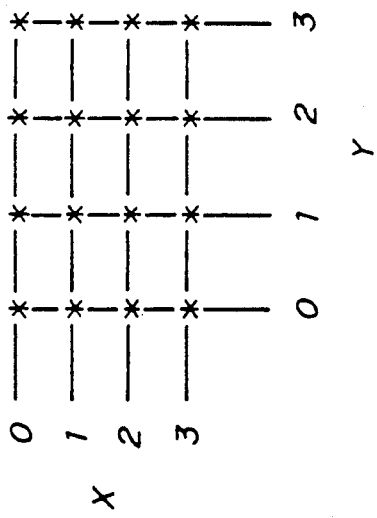

For the sake of understanding the present invention, a description will now be given of a conventional ATM switching system. Referring to FIG. 1A, there is illustrated the principle of an ATM switch. The ATM switch is of a cross-bar type. The ATM switch in FIG. 1A has four inputs X0-X3 and four outputs Y0-Y3. Input lines carry inputs X0-X3 and output lines carry outputs Y0-Y3. A cell switching operation is carried out at crosspoints between the input lines and output lines, which are indicated by marks "*". A buffer is provided at each of the crosspoints. Input cells X0-X3 on the input lines are written into the buffers at the crosspoints between the selected outputs lines and the input lines. For example, when the output Y2 is selected, an input cell at the input X1 is stored in the buffer at the crosspoint of the input line related to X1 and the output line related to Y1. As has been described previously, each input cell has a header and data. The header includes information indicating which route should be selected. This information is analyzed at each of the crosspoints. When a controller provided in each of the crosspoints together with the buffer determines that the header of an input cell indicates a route related to its own, the controller controls the buffer so that it stores the input cell.

Figure 1B:
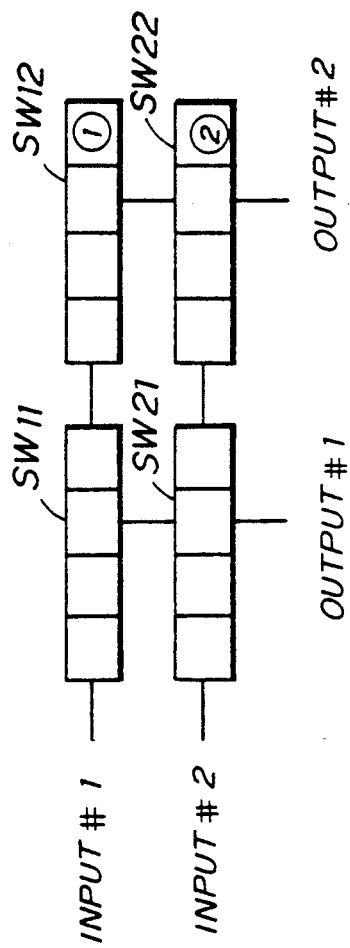

FIG. 1B illustrates the structure of an ATM switch structure which has two inputs and two outputs. The ATM switch structure shown in FIG. 1B has four crosspoint switches SW11, SW12, SW21 and SW22. When cell ① having route select information indicating "2" (which means output #2) is applied to input #1, the crosspoint switch SW12 having the route select information "2" inputs the cell ①. Thus, the cell ① is delivered to output #2 through the crosspoint switch SW12.

At this time, if cell ② having route select information indicative of "2" is input to input #2, it is output to output #2 through the crosspoint switch SW22. In this case, the two cells ① and ② collide with each other at output #2. Each of the crosspoint switches SW11-SW22 has a buffer for temporarily storing cells. The output timings at which the cells ① and ② are output are adjusted so that the collision of the cells ① and ② is avoided. As shown in FIG. 1B, although the cells ① and ② are written into the crosspoint switches SW12 and SW22, respectively, the cells ① and ② are output therefrom at different timings, as shown in FIG. 1C. In the case shown in FIG. 1C, the cell ② is output first and the cell ① is output second.

A conventional ATM switching system has two ATM switches which are identical to each other and operate in the above-mentioned way. When the two ATM switches are operating in the in-service state, one of the two ATM switches serves as the master ATM switch and the other ATM switch serves as the slave ATM switch. The master ATM switch actually transfers data and the slave ATM switch is in a waiting state.

FIG. 1D illustrates a case where two ATM switches #0 and #1 are provided and one of them serves as the master and the other serves as the slave. The two ATM switches #0 and #1 are in an identical state where four cells ①-④ are stored therein. A selector (called a subscriber line interface selector) SEL selects the cells which are output from the master ATM switch. It is now assumed that the ATM switch SW#0 serves as the master ATM switch. It will be noted that although the cells are read out from the slave ATM switch at the same time as the cells are output from the master ATM switch, they are not selected. As described above, the two ATM switches SW#0 and SW#1 have the same contents and operate in the same way. Thus, even if a fault takes place in the master ATM switch SW#0, it is possible to have the ATM switch SW#1 operate in the master mode, instead of the ATM switch SW#0.

However, the conventional dual ATM switch structure described above has the following problem. It is now assumed that a fault occurs in the ATM switch SW#1. In this case, the ATM switch SW#1 is placed in the out-of-service state and the outstanding fault is detected and eliminated. Then, the ATM switch SW#1 is switched from the out-of-service state to the in-service state whereby it serves as the slave ATM switch. In this case, there is a problem in that the number of cells in the ATM switch SW#0 is not equal to that of the cells in the ATM switch SW#1.

This problem will be described in more detail with reference to FIG. 1E. FIG. 1E illustrates a state observed immediately after the ATM switch SW#1 has been changed from the out-of-service state to the slave state. All the cells in the ATM switch SW#1 are erased when it is set to the out-of-service state, and input cell ④ is written into the ATM switch SW#1 after it is switched to the slave mode. In this case, when the ATM switch SW#1 is switched to the master and the ATM switch SW#0 is switched to the slave, cells ① ② and ③ stored in the ATM switch SW#0 are lost. The present invention is mainly directed to eliminating this problem.

Figure 2:
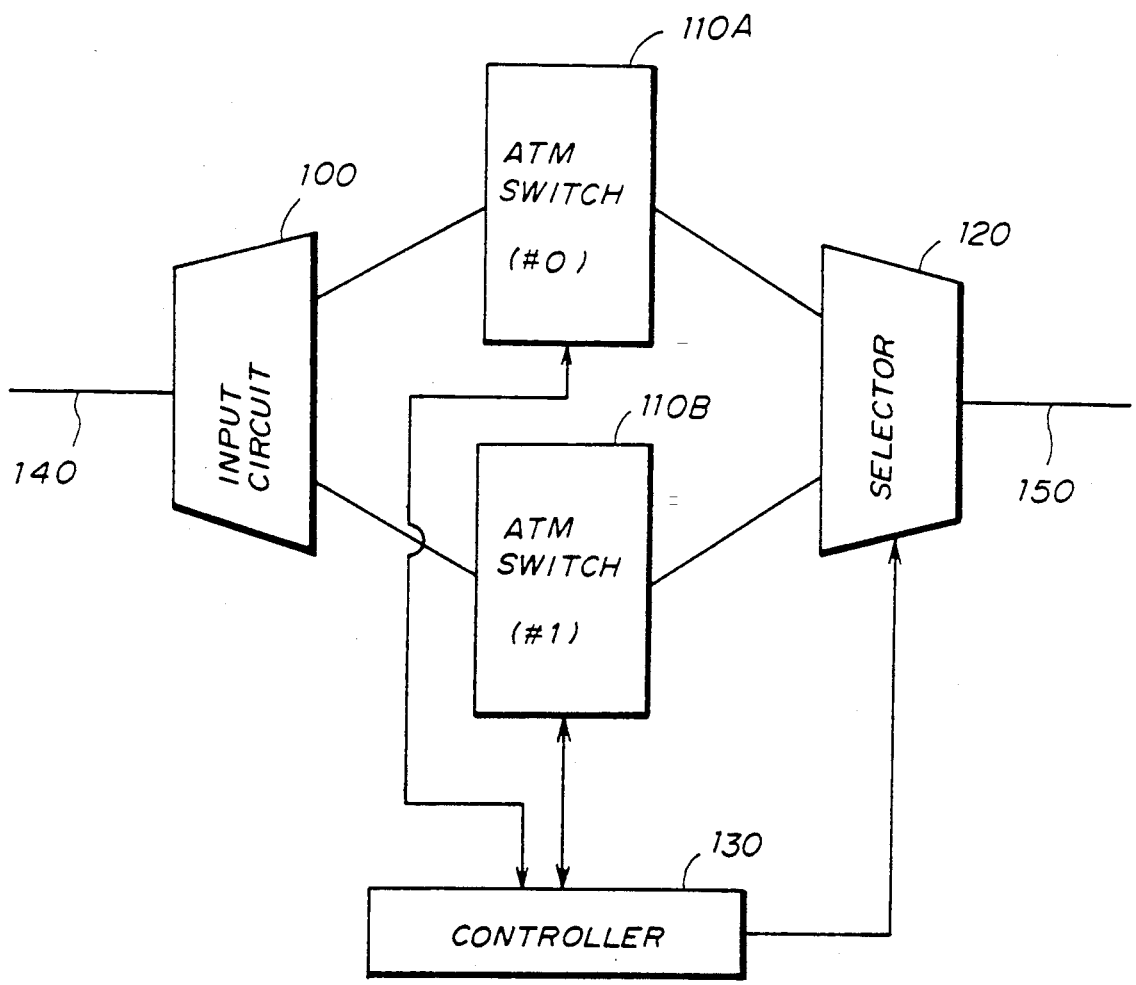
FIG. 2 is a block diagram of the entire structure of an ATM switching system having a dual ATM switch structure according to the present invention.

FIG. 2 illustrates the entire structure of an ATM switching system according to the present invention. The ATM switching system in FIG. 2 includes an input circuit 100, two ATM switches 110A (#0) and 110B (#1), a selector 120 and a controller 130. The input circuit 100 distributes input cells via an input transmission line 140 to the ATM switches 110A and 110B. That is, each input cell is supplied to not only the ATM switch 110A but also the ATM switch 110B. The ATM switches 110A and 110B have identical structures, which will be described in detail later. The selector 120 selects either the ATM switch 110A or the ATM switch 110B in accordance with a switch signal supplied from the controller 130. The controller 130 manages the ATM switches 110A and 110B and generates the above-mentioned switch signal which is supplied to the selector 120. Output cells selected by the selector 120 are supplied to an output transmission line.

FIG. 3 illustrates a detailed structure of a crosspoint switch provided at a crosspoint in the ATM switch 110A and a crosspoint switch provided at the corresponding crosspoint in the ATM switch 110B. A crosspoint switch $110A_1$ in the ATM switch 110A has a switch buffer $10a$, a cell counter $11a$, a dummy cell generator $12a$ and a difference calculator $13a$. Similarly, a crosspoint switch $110B_1$ in the ATM switch 110B has a switch buffer $10b$, a cell counter $11b$, a dummy cell generator $12b$ and a difference calculator $13b$. A selector $120_1$ is a part of the selector 120 shown in FIG. 2.

It is now assumed that the ATM switch 110A (crosspoint switch $110A_1$) serves as the master and the ATM switch 110B (crosspoint switch $110B_1$) is in the out-of-service state. In this state, the selector $120_1$ selects cells from the switch buffer $10a$ of the crosspoint switch $110A_1$. The cell counter $11a$ counts the number of cells in the switch buffer $10a$. Similarly, the cell counter $11b$ counts the number of cells in the switch buffer $10b$. The cell counter $11a$ of the master crosspoint switch $110A_1$ indicates the correct number of cells stored in the switch buffer $10a$. On the other hand, the count value in the cell counter $11b$ of the crosspoint switch $110B_1$ which is in the out-of-service state is not identical to that of the cell counter $11a$. In this state, according to the present invention, there are provided three different change procedures for changing the ATM switch 110B from the out-of-service state to the slave mode and then changing the same from the slave mode to the master.

A description will now be given of the first change procedure. The difference calculator $13b$ of the crosspoint switch $110B_1$ which is now in the out-of-service state calculates the difference between the count value in the cell counter $11a$ and the counter value in the cell counter $11b$ at the commencement of the first change procedure for changing the ATM switch 110B from the out-of-service state to the slave mode. It will be noted that the counter value in the cell counter $11b$ is indefinite. The calculation result, that is, the difference value, is supplied to the dummy generator $12b$ of the crosspoint switch $110B_1$ through a line L1. The dummy cell generator $12b$ generates a number of dummy cells which is equal to the difference value produced and output by the difference calculator $13b$. Then, the dummy cell generator $12b$ supplies the switch buffer $10b$ with the dummy cells. It will be noted that dummy cells are distinguished from other cells, described below.

As has been described previously, each cell is comprised of a header and information. The header includes service bits, which are provided for indicating the type of cell information being considered. A dummy cell identification number which is represented by the combinations of the values of the service bits and has not yet been used is given to each dummy cell. The dummy cell can include arbitrary information, such as all binary zeros. It will be noted that the length of each dummy bit should be equal to that of each cell.

The dummy cells generated and output by the dummy cell generator $12b$ are written into the switch buffer $10b$ so that the switch buffer $10b$ has the dummy cells as well as cells which have been input to the switch buffer $10b$ after the ATM switch 110B is switched to the slave mode. When each of the switch buffers $10a$ and $10b$ has output a number of cells which is equal to the total number of the dummy cells and the cells which are already in the switch buffer $10b$ when the dummy cells are written therein, all the dummy cells have been discharged so that the switch buffer $10b$ has cells which have been input after the dummy cells are written into the switch buffer $10b$. The controller 130 shown in FIG. 2 determines whether or not all the dummy cell have been discharged from the switch buffer $10b$. After this is confirmed, it is possible to change the ATM switch 110B from the slave mode to the master mode since the switch buffers $10a$ and the switch buffers $10b$ arranged at each crosspoint have the same contents (cells). At this time, the controller 130 sends the selector $120_1$ the switch signal so that the selector $120_1$ selects the cells from the switch buffer $10b$ of the crosspoint switch $110B_1$.

A description will now be given of the second change procedure. At first, the contents of the cell counter $11b$ of the crosspoint switch $110B_1$ are reset to zero by a reset signal M1, which is supplied from the controller 130 (FIG. 2). This is due to the fact that the contents of the switch buffer $10b$ which is in the out-of-service state are indefinite. Thereby, binary zeros are written into all the storage areas of the switch buffer $10b$. Next, the counter value in the cell counter $11a$ of the crosspoint switch $110A_1$ is read out therefrom. The readout counter value is supplied to the dummy cell generator $12b$ through a signal line M2. The dummy cell generator $12b$ generates a number of dummy cells which is equal to the counter value counted and output by the cell counter $11a$. The generated dummy cells are then written into the switch buffer $10b$. At this time, the cell counter $11b$ counts the number of the dummy cells which are written into the switch buffer $10b$. In this state, the controller 130 (FIG. 2) controls the crosspoint switch $110B_1$ so that it operates as the slave switch. Then cells are output from the switch buffers $10a$ and $10b$. When the last dummy cell has been output from the switch buffer $10b$, the contents of the switch buffer $10b$ become identical to the contents of the switch buffer $10a$. Thus, after that, it is possible to change the ATM switch $10b$ from the slave mode to the master mode. This changing time can be identified by determining whether or not the number of dummy cells (which is initially written into the cell counter $11b$) has been counted after the ATM switch 110B is changed to the slave mode.

A description will now be given of the third change procedure. The first step of the third change procedure is to read out the counter value in the cell counter $11a$ of the crosspoint switch $110A_1$ which is not operating as the master ATM switch. Next, under the control of the controller 130 (FIG. 2), the readout counter value is preset, through a signal line N1, in the cell counter $11b$ of the crosspoint switch $110B_1$ which is in the out-of-service state. Then, the ATM switch 110B is changed to the slave mode so that it is set to the in-service state. The crosspoint switch $110B_1$ operates as if a number of cells equal to the counter value written into the cell counter $11b$ is stored in the switch buffer $10b$. Thus, an input cell which is received after the crosspoint switch 110B₁ is changed to the slave mode is written into an area indicated by the next value of the counter value written into the cell counter 11b. Thus, it becomes possible to change the ATM switch 110B from the slave mode to the master mode after the preset number of cells is output from the switch buffer 10b.

FIG. 4 illustrates a more detailed structure of the crosspoint switch provided at a crosspoint in the ATM switch 110A and the crosspoint switch provided at the corresponding crosspoint in the ATM switch 110B in a case where the ATM switch system is designed to operate in accordance with the first change procedure. Referring to FIG. 4, a crosspoint switch 1110A in the ATM switch 110A (FIG. 2) is composed of a switch buffer 20a, a cell counter 21a, a dummy cell generator (marker) 22a and a difference calculator 23a. Similarly, a crosspoint switch 1110B in the ATM switch 110B (FIG. 2) is composed of a switch buffer 20b, a cell counter 21b, a dummy cell generator (marker) 22b and a difference calculator 23b.

Figure 5A:
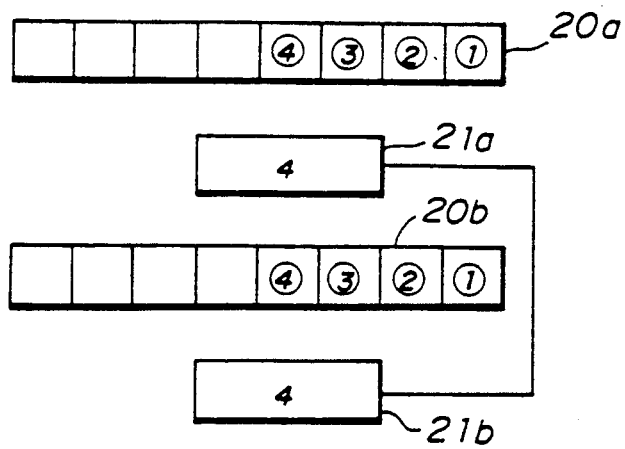
FIGS. 5A through 5E are diagrams illustrating the operation of the first preferred embodiment of the present invention shown in FIG. 4.
Figure 5B:
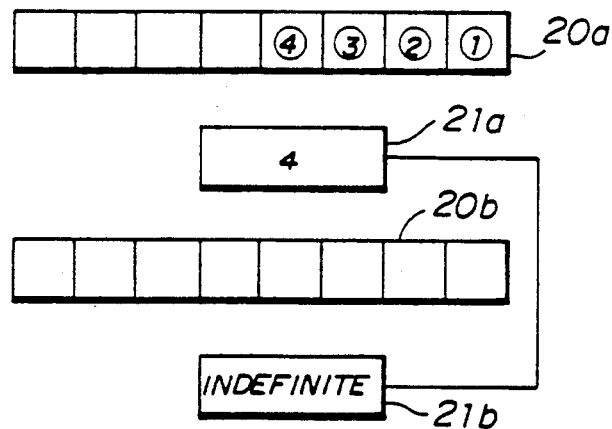

The operation of the dual ATM switch structure shown in FIG. 4 will now be described with reference to FIGS. 5A through 5E. It is now assumed that the ATM switch 110A (crosspoint switch 1110A) operates in the master mode and the ATM switch 110B (crosspoint switch 1110B) operates in the slave mode. In this state, as shown in FIG. 5A, both of the switch 20a and 20b have identical cells ①-④, and the cell counters 21a and 20b indicate identical counter value "4". It is further assumed that in this state, the ATM switch 110B in the slave mode is changed to the out-of-service state due to the occurrence of, for example, a fault. As is shown in FIG. 5B, all the cells ①-④ in the switch buffer 20b are erased. Even if all the cells in the switch buffer 20b are not erased, it is impossible to determine what cell is stored in the switch buffer 20b. Thus, the number of cells in the switch buffer 20b is indefinite. It will be noted that when the ATM buffer 110B which is in the state shown in FIG. 5B is changed to the slave state, the contents of the switch buffer 20b are different from those of the switch buffer 20a.

The ATM switch 110B is changed so that it can receive cells and outputs cells asynchronously. At this time, under the control of the controller 130 (FIG. 2), the difference calculator 23b calculates the difference between the counter value in the cell counter 21a and the counter value in the cell counter 21b, and produces a control signal representative of the calculated difference. At this time, the controller 130 (FIG. 2) controls the difference calculator 23a of the master crosspoint switch 1110A so that it does not operate. The dummy cell generator 22b generates the number of dummy cells which is equal to the difference value notified by the difference calculator 23b, and writes these dummy cells into the switch buffer 20b. Thereby the counter value in the cell counter 21b is increased so that the difference value is added to the number of cells which are already in the switch buffer 20b when the first dummy cell is written into the switch buffer 20b. After that, the counter value in each of the cell counters 21a and 21b changes each time a cell is written into each of the switch buffers 20a and 20b or read out therefrom. The difference calculator 23b always calculates the difference between the counter values in the cell counters 21a and 21b.

Figure 5C:
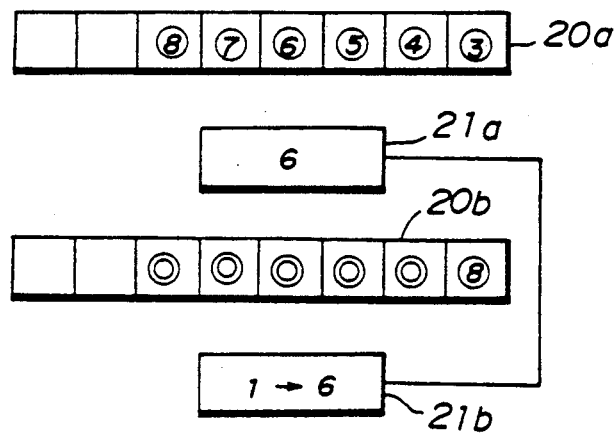
Figure 5D:
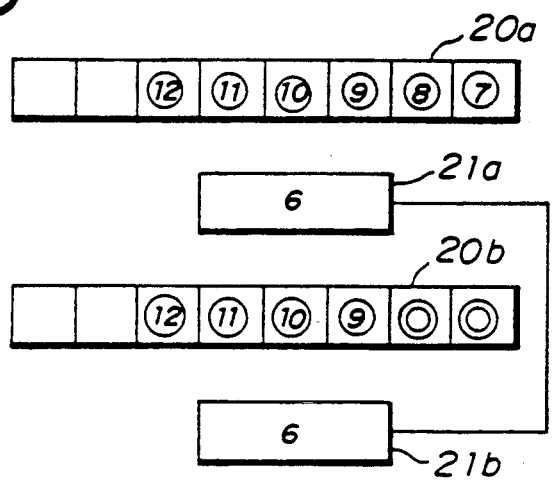
Figure 5E:
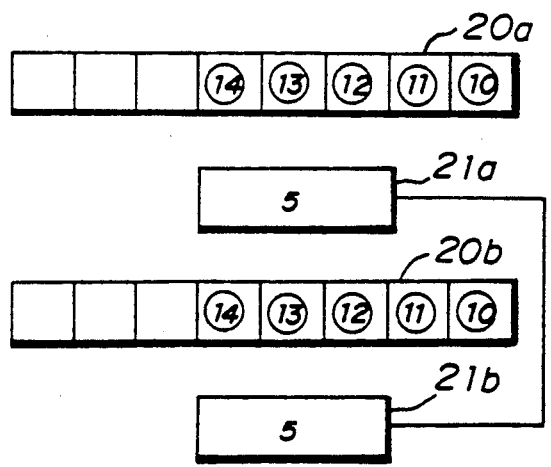

The above-mentioned procedure will now be described with reference to FIGS. 5C, 5D and 5E. In FIG. 5C, cell ⑧ is written into each of the switch buffers 20a and 20b after the ATM switch 110B is changed to the slave state from the out-of-service state. The difference calculator 23b calculates the difference between the counter values in the cell counters 22a and 22b in the state where the switch buffer 20b has only the cell ⑧. On the other hand, six cells ③-⑧ are stored in the switch buffer 20a and the counter value in the cell counter 21a is equal to 6. In this state, the difference value is equal to 5. The difference value 5 is written into the cell counter 21b so that the counter value in the cell counter 21b is changed to 6.

After that, the ATM switch 110B operates in the slave mode. FIG. 5D illustrates a state where four input cells ⑨-①② have been written into each of the switch buffers 20a and 20b and four cells have been output therefrom. It can be seen from the FIG. 5D that two dummy cells are still stored in the switch buffer 20b of the slave crosspoint switch 1110B. In this state, it is impossible to change the ATM switch 110B from the slave mode to the master mode. When two cells have been further output from each of the switch buffers 20a and 20b, the cells in the crosspoint switch 1110B become identical to those in the crosspoint switch 1110A, as shown in FIG. 5E. That is, the crosspoint switches 1110A and 1110B are synchronized with each other. In the above-mentioned manner, it is possible to change the ATM switch 110A to the master mode after the number of input cells which is equal to the counter value in the cell counter 21b obtained when the number of dummy cells (which corresponds to the difference value produced and output by the difference calculator 23b) is written into the switch buffer 20b, is input to each of the switch buffers 20a and 20b.

Figure 6:
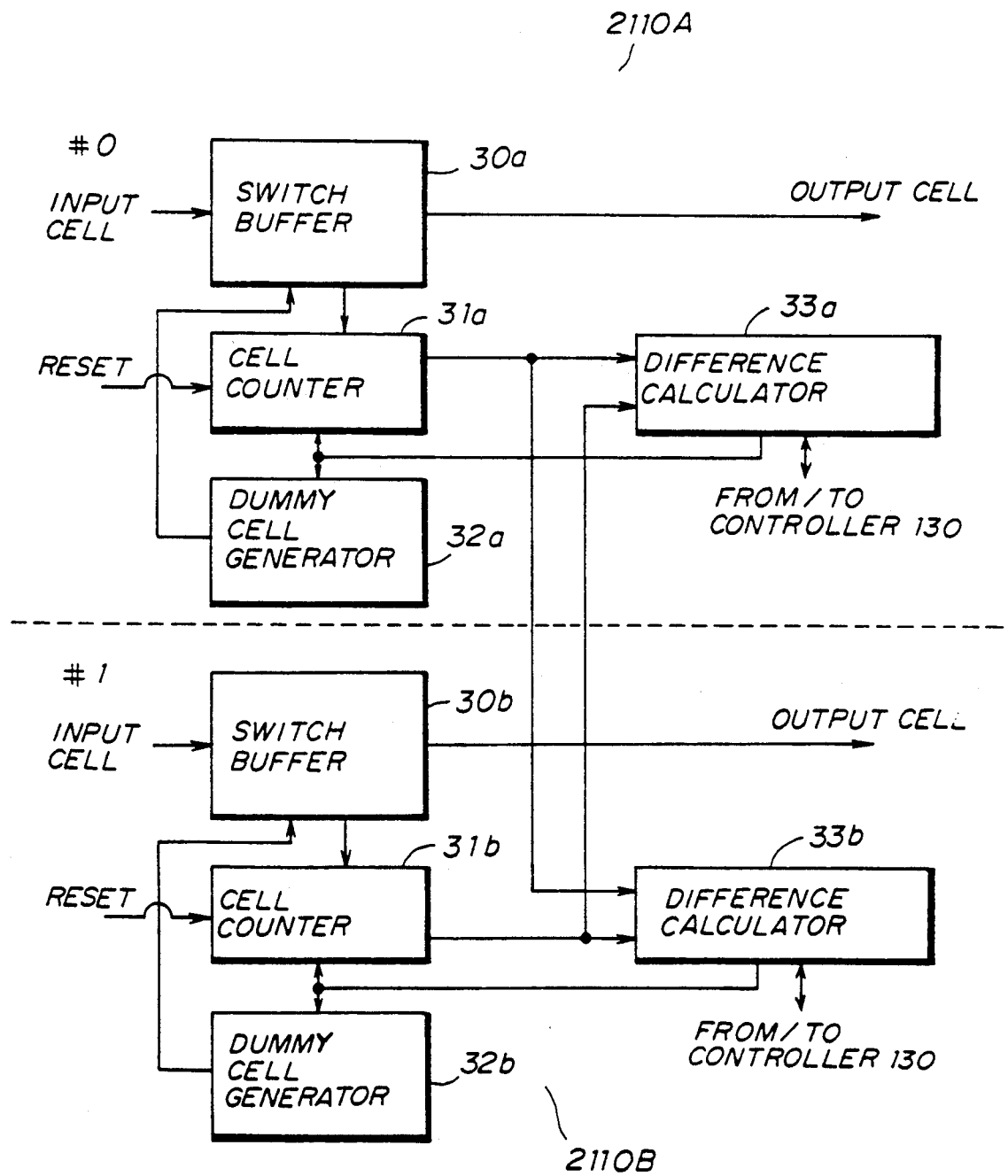
FIG. 6 is a block diagram of a crosspoint switch arranged at a crosspoint in one of the two ATM switches in the ATM switching system shown in FIG. 2 and a crosspoint switch at the corresponding crosspoint in the other ATM switch according to a second preferred embodiment of the present invention.

FIG. 6 illustrated a more detailed structure of the crosspoint switch arranged at a crosspoint in the ATM switch 110A and the crosspoint switch at the corresponding crosspoint in the ATM switch 110B in a case where the ATM switching system is designed to operate in accordance with the aforementioned second change procedure. Referring to FIG. 6, a crosspoint switch 2110A in the ATM switch 110A is composed of a switch buffer 30a, a cell counter 31a, a dummy cell generator (marker) 32a and a difference calculator 33a. Similarly, a crosspoint switch 2110B in the ATM switch 110b is composed of a switch buffer 30b, a cell counter 31b, a dummy cell generator (marker) 32b and a difference calculator 33b.

Figure 7A:
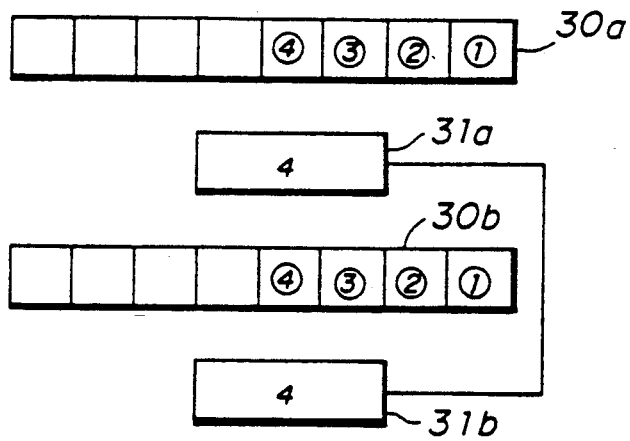
FIGS. 7A through 7E are diagrams illustrating the operation of the second preferred embodiment of the present invention shown in FIG. 6.
Figure 7B:
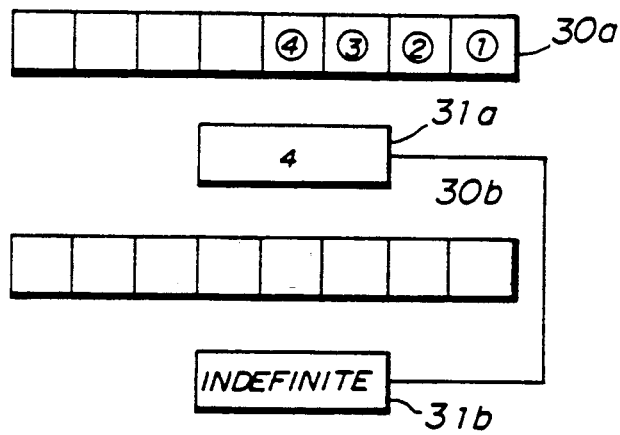

The operation of the dual ATM switch structure shown in FIG. 6 will now be described with reference to FIGS. 7A through 7E. It is now assumed that the ATM switch 110A operates in the master mode and the ATM switch 110B operates in the slave mode. In this state, as shown in FIG. 7A, both of the switch buffers 30a and 30b have identical cells ①-④, and the cell counters 31a and 31b indicate identical counter value "4". It is further assumed that in this state, the ATM switch 110B in the slave mode is changed to the out-of-service state due to the occurrence of a fault, for example. As is shown in FIG. 7B, all the cells ①-④ in the switch buffer 30b are erased. Even if all the cells in the switch buffer 30b are not erased, it is impossible to determine what cell is stored in the switch buffer 30b. Thus, the number of cells in the switch buffer 30b is indefinite. It will be noted that when the ATM buffer 110B which is in the state shown in FIG. 7B is changed to the slave state, the contents of the switch buffer 30b are different from those of the switch buffer 30a.

In this state, the controller 130 (FIG. 2) resets the cell counter 31b so that the contents thereof become zero. The difference calculator 33b of the crosspoint switch 2110B calculates the difference between the counter values in the cell counters 31a and 31b. The calculated difference value corresponds to the counter value in the cell counter 31a of the crosspoint switch 2110A. A control signal representative of the difference value produced and output by the difference calculator 33b is sent to the cell counter 31b and the dummy cell generator 32b.

The dummy cell generator 32b generates a number of dummy cells which is equal to the difference value, and writes the dummy cells into the switch buffer 30b. Each time one dummy cell is written into the switch buffer 30b, the cell counter 31b is incremented by +1. Alternatively, it is possible to write the total number of dummy cells to be written into the switch buffer 30b at one time. In this manner, the difference value which is equal to the counter value in the cell counter 31a is written into the cell counter 31b.

Figure 7C:
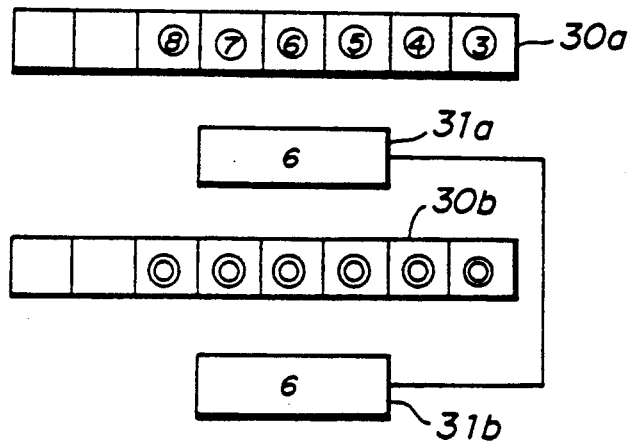
Figure 7D:
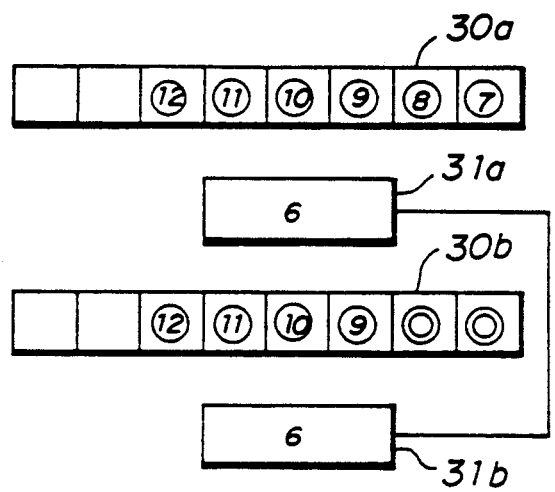
Figure 7E:
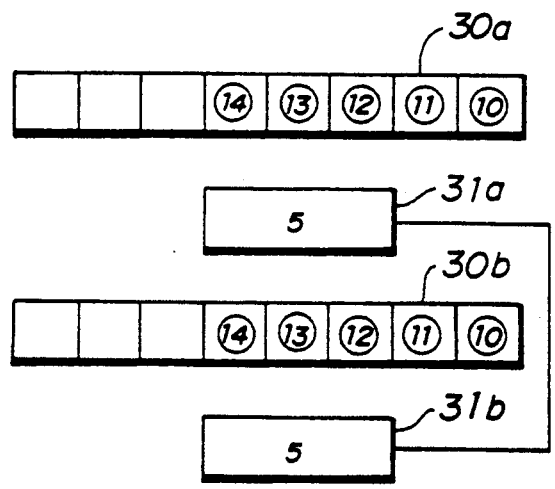

As is shown in FIG. 7C, six dummy cells are written into the switch buffer 30b and numeral 6 is written into the cell counter 31b when the switch buffer 30a has six cells ③-⑧. After that, the crosspoint switch 2110B operates in the slave mode, and the contents of the switch buffers 30a and 30b and the cell counters 31a and 31b change, as shown in FIGS. 7D and 7E. When six cells have been output from each of the switch buffers 30a and 30b from the state shown in FIG. 7C, all the dummy cells have been output therefrom, and the contents of the switch buffers 30a and 30b become identical to each other. After that, it is possible to change the ATM switch 110B from the slave mode to the master mode.

FIG. 8 illustrates a more detailed structure of the crosspoint switch arranged at a crosspoint in the ATM switch 110A and the crosspoint switch at the corresponding crosspoint in the ATM switch 110B in a case where the ATM switching system is designed to operate in accordance with the aforementioned third change procedure. Referring to FIG. 8, a crosspoint switch 3110A in the ATM switch 110A is composed of a switch buffer 40a, a cell counter 41a and a difference calculator 42a. Similarly, a crosspoint switch 3110B in the ATM switch 110b is composed of a switch buffer 40b, a cell counter 41b and a difference calculator 42b.

Figure 9A:
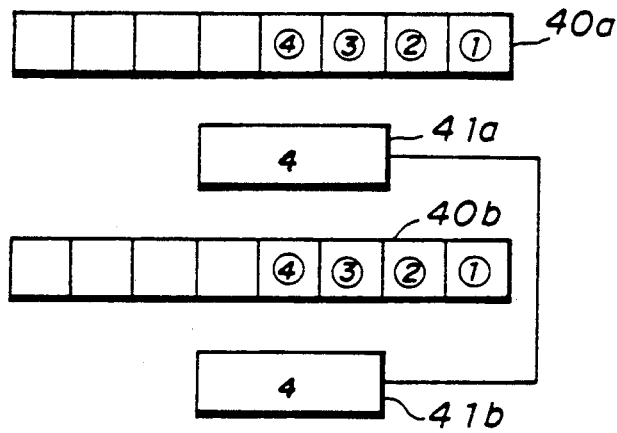
FIGS. 9A through 9E are diagrams illustrating the operation of the third preferred embodiment of the present invention shown in FIG. 8.
Figure 9B:
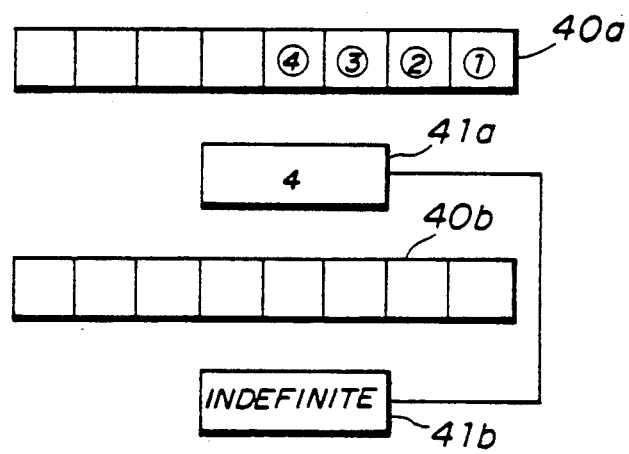

The operation of the dual ATM switch structure shown in FIG. 8 will now be described with reference to FIGS. 9A through 9E. It is now assumed that the AT switch 110A (crosspoint switch 3110A) operates in the master mode and the ATM switch 110B (crosspoint switch 3110B) operates in the slave mode. In this state, as shown in FIG. 9A, both of the switch buffers 40a and 40b have identical cells and the cell counters 41a and 41b indicate identical counter values "4". It is further assumed that in this state, the ATM switch 110B in the slave mode is changed to the out-of-service state due to the occurrence of a fault, for example. As is shown in FIG. 9B, all the cells ①-④ in the switch buffer 40b are erased. Even if all the cells in the switch buffer 40b are erased, it is impossible to determine what cell is stored in the switch buffer 40b. Thus, the number of cells in the switch buffer 40b is indefinite. It will be noted that when the ATM buffer 110B which is in the state shown in FIG. 9B is changed to the slave state, the contents of the switch buffer 40b are different from those of the switch buffer 40a.

In this state, the controller 130 (FIG. 2) controls the difference calculator 42b so that it calculates the difference between the counter values in the cell counters 41a and 41b. The calculated difference value produced and output by the difference counter 42b is written, as a preset value, into the cell counter 41b of the crosspoint switch 3110B. During this operation, the cell counter is incremented one by one. It is possible to employ an alternative to the difference calculation procedure. In the alternative, the cell counter related to the switch buffer which is in an out-of-service state (cell counter 41b in this case) is reset and then the difference calculation is carried out. Then the difference value thus obtained is written, as a preset value, into the cell counter 41b.

Figure 9C:
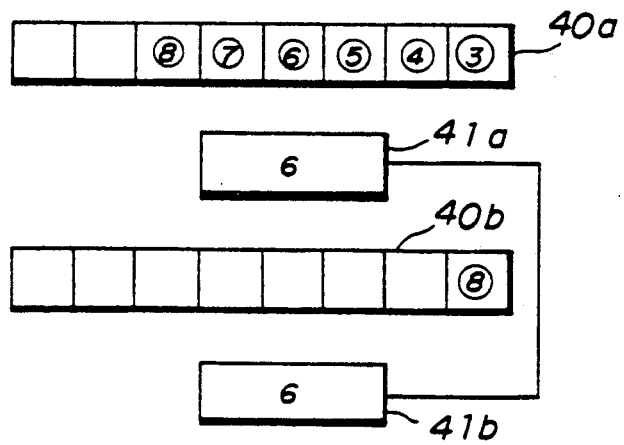
Figure 9D:
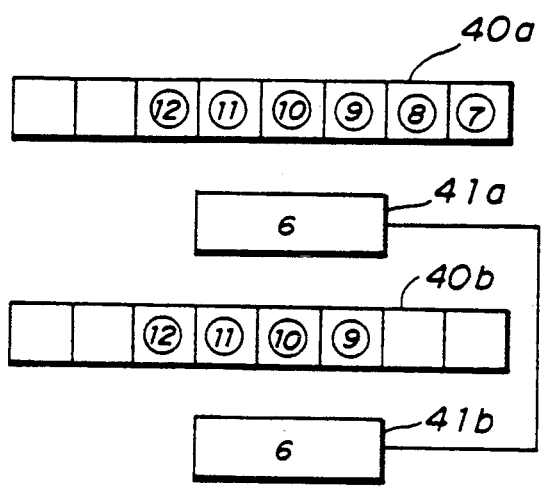
Figure 9E:
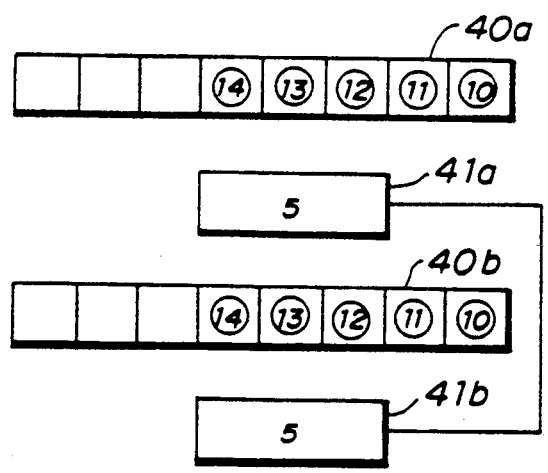

In FIG. 9C, counter value 6 in the cell counter 41a representative of the number of cells in the switch buffer 40a is written into the cell counter 41b irrespective of (that is, by resetting the counter value) the counter value in the cell counter 41b. That is, FIG. 9C illustrates the state obtained after a numeral 6 is preset in the cell counter 41b. After that, the switch buffer 40b operates in the slave mode, and the contents of the switch buffers 40a and 40b and the contents of the cell counters 41a and 41b changes, as shown in FIGS. 9D and 9E. When the number of cells identical to the preset value has been output from the switch buffer 40b, the contents of the switch buffer 40b become identical to those of the switch buffer 40a. Thus, it becomes possible to change the ATM switch 110B from the slave mode to the master mode.

Each of the aforementioned switch buffers can be formed of an elastic memory. As is well known, a write reset signal and a read reset signal are supplied to the elastic memory. Data is written into the elastic memory in synchronism with a write clock, and data is read out therefrom in synchronism with a read clock. It is possible to determine how many cells have been written into the elastic memory after the write reset signal is applied thereto. It is also possible to determine how many cells have been read out from the elastic memory after the read reset signal is applied thereto. Each of the aforementioned cell counter is supplied with these clock signals and determines the number of cells which are stored in the related switch buffer by calculating the difference between the number of write clocks and the number of read clocks.

The present invention is not limited to the specifically disclosed embodiments, and variations and modifications may be made without departing from the scope of the present invention.

What is claimed is:

1. An ATM (asynchronous transfer mode) switching system comprising:
   a first ATM switch having input lines and output lines;
   a second ATM switch having input lines and output lines, said first ATM switch having a structure identical to said second ATM switch;
   input means, coupled to said first and second ATM switches, for supplying cells via an input transmission line to said input lines of said first and second ATM switches; and
   select means, coupled to said first and second ATM switches, for selecting either one of said first ATM switch or said second ATM switch so that the output lines of a selected one of the first and second ATM switches are coupled to an output line extending rom said ATM switching system and operates in a master mode, wherein each of said first and second ATM switches includes:

buffer means, provided at a crosspoint where a corresponding one of said input lines and a corresponding one of said output lines cross, for temporarily storing said cells supplied from said corresponding one of the input lines and for outputting said cells to said corresponding one of the output lines;

counter means, coupled to said buffer means, for counting a number of said cells in said buffer means and for outputting a counter value indicative of the number of said cells;

different calculating means provided for each of the first and second ATM switches, and coupled to said counter means of said first ATM switch and said counter means of said second ATM switch, for calculating a difference between the counter values in said counter means of said first and second ATM switches when said selected one of the first and second ATM switches is in an in-service state and the other one of said first and second ATM switches is in an out-of-service state; and dummy cell generating means, coupled to said difference calculating means and said buffer means, for generating a number of dummy cells corresponding to said difference produced by said difference calculating means and for writing said dummy cells into said buffer means of the other one of the first and second ATM switches which is in the out-of-service state so that the other one of the first and second ATM switches in the out-of-service state is changed to a slave mode from the out-of-service state, and wherein said ATM switching system further comprises control means coupled to the counter means of each of the first and second ATM switches, and the select means, for determining whether or not said dummy cells in said buffer means of the other one of the first and second ATM switches in the slave mode have been output therefrom, so that when it is determined by said control means that all of said dummy cells have been output from said buffer means, the first and second ATM switches are synchronized with each other, and for controlling the selector means to execute the switching between the first and second ATM switches after all of the dummy cells have been output from the buffer means of the other one of the first and second ATM switches.

2. An ATM switching system as claimed in claim 1, wherein:

when said dummy cells are written into said buffer means, said counter value in said counter means indicates a total number of cells which corresponds to the sum of the number of said dummy cells and a number of cells which are already stored at this time; and said control means comprises means for determining whether said total number of cells has been output from said buffer means.

3. An ATM switching system as claimed in claim 1, wherein said control means comprises:

first means for resetting said counter means of the other one of the first and second ATM switches in the slave mode to zero when said dummy cells are written into said buffer means so that said counter value in said counter means indicates the number of said dummy cells; and second means for determining whether or not all of said dummy cells have been output from said buffer means.

4. An ATM switching system as claimed in claim 3, wherein said counter value in said counter means indicates the number of said dummy cells which is equal to the counter value of said counter means indicative of a number of cells in said buffer means of said selected one of the first and second ATM switches which is in the in-service state.

5. An ATM switching system as claimed in claim 1, wherein:

said select means has a terminal to which a switch signal is applied; and said control means comprises switch signal generating means for generating said switch signal after it is determined that all of said dummy cells have been output from said buffer means.

6. An ATM switching system as claimed in claim 5, wherein said switch signal generating means generates said switch signal which enables the other one of the first and second ATM switches to change from the slave mode to the master mode.

7. An ATM switching system as claimed in claim 1, wherein:

said dummy cell generating means generates the dummy cells, each of which is composed of a header and information;

said header includes specific data which serves as an identification of the dummy cells; and said information in each of the dummy cells has arbitrary data.

8. An ATM switching system as claimed in claim 1, wherein each of said dummy cells has a length identical to that of each of said cells.

9. An ATM switching system as claimed in claim 1, wherein said buffer means comprises an elastic memory.

10. An ATM (asynchronous transfer mode) switching system comprising:

a first ATM switch having input lines and output lines;

a second ATM switch having input lines and output lines, said first ATM switch having a structure identical to said second ATM switch;

input means, coupled to said first and second ATM switches, for supplying cells via an input transmission line to said input lines of said first and second ATM switches; and select means, coupled to said first and second ATM switches, for selecting either one of said first ATM switch or said second ATM switch so that the output lines of a selected one of the first and second ATM switches are coupled to an output transmission line extending from said ATM switching system and operates in a master mode, wherein each of said first and second ATM switches includes:

buffer means, provided at a crosspoint where a corresponding one of said input lines and a corresponding one of said output lines cross, for temporarily storing said cells supplied from said corresponding one of the input lines and for outputting said cells to said corresponding one of the output lines;

counter means provided for each of said first and second ATM switches, and coupled to said buffer means, for counting a number of said cells in said buffer means and for outputting a counter value indicative of the number of said cells, said counter value in said counter means of said selected one of the first and second ATM switches which is in an in-service state being written into said counter means of the other one of the first and second ATM switch which is in an out-of-service state so that the other one of the first and second ATM switch is changed to a slave mode from the out-of-service state; and difference calculating means provided for each of the first and second ATM switches, and coupled to said counter means of said first ATM switch and said counter means of said second ATM switch, for calculating a difference between the counter values in said counter means of said first and second ATM switches when said selected one of the first and second ATM switches is in the in-service state and the other of the first and second ATM switches is in the out-of-service state, and wherein said ATM switching system further comprises control means coupled to the counter means of each of the first and second ATM switches, and the select means, for determining whether a number of cells which corresponds to the counter value written into said buffer means of the other one of the first and second ATM switches which is in the slave mode has been output from said buffer means, so that when it is determined by said control means that said number of cells has been output from said buffer means in the slave mode, the first and second ATM switches are synchronized with each other, and for controlling said select means to execute switching between said first and second ATM switches.

11. An ATM switching system as claimed in claim 10, wherein:

said select means has a terminal to which a switch signal is sent; and said control means comprises switch signal generating means for generating said switch signal after it is determined that said number of cells which corresponds to the counter value written into said buffer means of the other one of the first and second ATM switches which is in the slave mode has been output from said buffer means.

12. An ATM switching system as claimed in claim 11, wherein said switch signal generating means generates said switch signal which enables said the other one of the first and second ATM switches to change from the slave mode to the master mode.

13. An ATM switching system as claimed in claim 10, wherein said buffer means comprises an elastic memory.

14. An ATM switching system (asynchronous transfer mode) comprising:

a first ATM switch having input lines and output lines;

a second ATM switch having input lines and output lines, said first ATM switch having a structure identical to said second ATM switch, each of said first and second ATM switches including buffer means, provided at a crosspoint where a corresponding one of said input lines and a corresponding one of said output lines cross, for temporarily storing cells supplied from said corresponding one of the input lines and for outputting said cells to said corresponding one of the output lines;

input means, coupled to said first and second ATM switches, for supplying said cells via an input transmission line to said input lines of said first and second ATM switches;

select means, coupled to said first and second ATM switches, for selecting either one of said first ATM switch or said second ATM switch so that the output lines of a selected one of the first and second ATM switches are coupled to an output transmission line extending from said ATM switching system and operates in a master mode;

dummy cell generating means, coupled to said first and second ATM switches, for generating a predetermined number of dummy cells and for writing said dummy cells into said buffer means of the other one of the first and second ATM switches which is in an out-of-service state; and control means coupled to said select means, and coupled to said first and second ATM switches, for determining whether all of said dummy cells have been output from said buffer means after the other one of the first and second ATM switches is changed from said out-of-service state to a slave mode, the other one of said first and second ATM switches operating in an in-service state where said selected one of the first and second ATM switches is in a master mode, so that when it is determined by said control means that all of said dummy cells have been output from said buffer means, the first and second ATM switches are synchronized with each other, and for controlling the select means to execute the switching between the first and second ATM switches after all of the dummy cells have been output from the buffer means of the other one of the first and second ATM switches.

15. An ATM switching system as claimed in claim 14, wherein:

said dummy cell generating means generates the dummy cells, each of which is composed of a header and information;

said header includes specific data which serves as an indentification of the dummy cells; and said information in each of the dummy cells has arbitrary data.

16. AN ATM switching system as claimed in claim 14, wherein each of said dummy cells has a length identical to each of said cells.

17. An ATM switching system (asynchronous transfer mode) comprising:

a first ATM switch having input lines and output lines;

a second ATM switch having input lines and output lines, said first ATM switch having a structure identical to said second ATM switch, each of said first and second ATM switches including buffer means, provided at a crosspoint where a corresponding one of said input lines and a corresponding one of said output lines cross for temporarily storing cells supplied from said corresponding one of the input lines and for outputting said cells to said corresponding one of the output lines;

input means, coupled to said first and second ATM switches, for supplying said cells via an input transmission line to said input lines of said first and second ATM switches;

select means, coupled to said first and second ATM switches, for selecting either one of said first ATM switch or said second ATM switch so that the output lines of a selected one of the first and second AM switches are coupled to an output transmission line extending from said ATM switching system and operates in a master mode;

counter means, coupled to said first and second ATM switches, for counting a number of cells in said buffer means of said selected one of the first and second ATM switches which is in an in-service state so that said selected one of the first and second ATM switches operates in a master mode; and control means coupled to said select means, and coupled to said first and second ATM switches and said counter means, for determining whether a number of cells which is equal to said number of cells counted by said counter means has been output from said buffer means of the other one of the first and second ATM switches after the other one of the first and second ATM switches is changed from an out-of-service state to a slave mode, so that when it is determined by said control means that said number of cells has been output from said buffer means in the slave mode, the first and second ATM switches are synchronized with each other, and for controlling said select means to execute switching between said first and second ATM switches.

18. A method for determining that data stored in a buffer of a first ATM (asynchronous transfer mode) switch is identical to data stored in a buffer of a second ATM switch, comprising the steps of:
   a) counting a total amount of data stored in the buffer of the first ATM switch;
   b) inputting identical input data into the buffers of the first and second ATM switches when input data is present;
   c) outputting corresponding output data from the buffers of the first and second ATM switches;
   d) counting an amount of corresponding output data output from the buffers of the first and second ATM switches in said step (c);
   e) comparing the amount of corresponding output data output from the buffers of the first and second ATM switches counted in said step (d) with the total amount of data counted in said step (a);
   f) determining that the data in the buffer of the first ATM switch is identical to the data in the buffer of the second ATM switch when said comparing of said step (e) indicates that the amount of data output from the buffers of the first and second ATM switches counted in said step (d) is greater than or equal to the total amount of data counted in said step (a); and
   g) repeating said steps (b)-(f) when sai comparing of said step (e) indicates that the amount of data output from the buffers of the first and second ATM switches counted in said step (d) is less than the total amount of data counted in said step (a).

19. A method for determining that data stored in a buffer of a first ATM (asynchronous transfer mode) switch is identical to data stored in a buffer of a second ATM switch, comprising the steps of:
   a) counting a total amount of data stored in the buffer of the first ATM switch;
   b) inputting dummy data to the buffer of the second ATM switch based on the total amount of data counted in said step (a);
   c) inputting identical input data into the buffers of the first and second ATM switches when input data is present;
   d) outputting corresponding output data from the buffers of the first and second ATM switches;
   e) counting an amount of corresponding output data output from the buffers of the first and second ATM switches in said step (d);
   f) comparing the amount of corresponding output data output from the buffers of the first and second ATM switches counted in said step (e) with the total amount of data counted in said step (a);
   g) determining that the data in the buffer of the first ATM switch is identical to the data in the buffer of the second ATM switch when said comparing of said step (f) indicates that the amount of data output from the buffers of the first and second ATM switches counted in said step (e) is greater than or equal to the total amount of data counted in said step (a); and
   h) repeating said steps (b)-(g) when said comparing of said step (e) indicates that the amount of data output from the buffers of the first and second ATM switches counted in said step (e) is less than the total amount of data counted in said step (a).

20. A method for determining that data stored in a buffer of a firs ATM (asynchronous transfer mode) switch is identical to data stored in a buffer of a second ATM switch, comprising the steps of:
   a) counting a total amount of data stored in the buffer of the first ATM switch;
   b) counting a total amount of data stored in the buffer of the second ATM switch;
   c) determining a difference between the total amount of data stored in the buffer of the first ATM switch and the total amount of data stored in the buffer of the second ATM switch;
   d) inputting dummy data into the buffer of the second ATM switch based on the difference of said step (c);
   e) inputting identical input data into the buffers of the first and second ATM switches when input data is present;
   f) outputting corresponding output data from the buffers of the first and second ATM switches;
   g) counting an amount of corresponding output data output from the buffers of the first and second ATM switches in said step (f);
   h) comparing the amount of corresponding output data output from the buffers of the first and second ATM switches counted in said step (g) with the total amount of data counted in said step (a);
   i) determining that the data in the buffer of the first ATM switch is identical to the data in the buffer of the second ATM switch when said comparing of said step (h) indicates that the amount of data output from the buffers of the first and second ATM switches counted in said step (g) is greater than or equal to the total amount of data counted in said step (a); and
   j) repeating said steps (e)-(i) when said comparing of said step (h) indicates that the amount of data output from the buffers of the first and second ATM switches counted in said step (g) is less than the total amount of data counted in said step (a).

* * * * *

UNITED STATES PATENT AND TRADEMARK OFFICE
CERTIFICATE OF CORRECTION

PATENT NO. : 5,153,578
DATED : October 6, 1992
INVENTOR(S) : Naoyuki IZAWA et al.

It is certified that error appears in the above-identified patent and that said Letters Patent is hereby corrected as shown below:

Column 1, line 7, "relates ATM" should be --relates to an ATM--.

Column 10, line 14, "⑨-①②" should be --⑨-⑫--.

Column 11, line 50, "AT" should be --ATM--.

Column 16, line 42, "indentification" should be --identification--.

Column 17, line 2, "AM" should be --ATM--.

Column 17, line 53, "sai" should be --said--.

Column 18, line 27, "firs" should be --first--.

Signed and Sealed this

Nineteenth Day of October, 1993

Attest:

BRUCE LEHMAN

Attesting Officer     Commissioner of Patents and Trademarks